(12) United States Patent
Mietke

(10) Patent No.: US 11,693,834 B2
(45) Date of Patent: Jul. 4, 2023

(54) MODEL GENERATION SERVICE FOR DATA RETRIEVAL

(71) Applicant: SAP SE, Walldorf (DE)

(72) Inventor: Sebastian Mietke, Wiesloch (DE)

(73) Assignee: SAP SE, Walldorf (DE)

( * ) Notice: Subject to any disclaimer, the term of this patent is extended or adjusted under 35 U.S.C. 154(b) by 349 days.

(21) Appl. No.: 17/145,605

(22) Filed: Jan. 11, 2021

(65) Prior Publication Data
US 2022/0222225 A1 Jul. 14, 2022

(51) Int. Cl.
| | | |
|---|---|---|
| G06F 16/00 | (2019.01) | |
| G06F 16/21 | (2019.01) | |
| G06F 16/22 | (2019.01) | |
| G06F 16/25 | (2019.01) | |
| G06N 20/00 | (2019.01) | |
| G06F 21/62 | (2013.01) | |

(52) U.S. Cl.
CPC ........ *G06F 16/212* (2019.01); *G06F 16/2282* (2019.01); *G06F 16/252* (2019.01); *G06F 21/6245* (2013.01); *G06N 20/00* (2019.01)

(58) Field of Classification Search
CPC .............. G06F 16/212; G06F 16/2282; G06F 21/6245; G06F 16/252
See application file for complete search history.

(56) References Cited

U.S. PATENT DOCUMENTS

| | | | | |
|---|---|---|---|---|
| 10,423,591 | B2 * | 9/2019 | Aneppanavar | .......... G06F 11/36 |
| 2012/0110021 | A1 * | 5/2012 | Hryniewicki | ......... G06F 16/212 |
| | | | | 707/790 |
| 2014/0046936 | A1 * | 2/2014 | John | ..................... G06F 16/212 |
| | | | | 707/723 |
| 2016/0292591 | A1 * | 10/2016 | Guirguis | ................ G06N 20/20 |
| 2019/0332781 | A1 * | 10/2019 | Natanzon | ............... G06F 3/065 |
| 2020/0201836 | A1 * | 6/2020 | Okamura | ............. G06F 16/212 |
| 2022/0107922 | A1 * | 4/2022 | Krishnamoorthy | .... G06N 20/00 |

* cited by examiner

*Primary Examiner* — Cheryl Lewis
(74) *Attorney, Agent, or Firm* — Buckley, Maschoff & Talwalkar LLC

(57) ABSTRACT

Provided is a system and method for generating and updating a data model for use in retrieving data from an information retrieval system such as a database, a server, and the like. In one example, the method may include monitoring data that is written to database tables of a database by a software process, identifying links between the database tables where the monitored data is written, determining whether the software process has a pre-existing data model for retrieving data stored in the database, and in response to a determination that the software process does not include the pre-existing data model, creating a new data model for the software process which includes names of the database tables where the monitored data is written and links between the database tables, and storing the new data model via a database repository.

20 Claims, 8 Drawing Sheets

100

500

Monitoring Data that is Written to Database Tables — 510

Identifying Links Between the Database Tables — 520

Determining Whether the Software Process has a Pre-existing Data Model — 530

In Response to a Determination that the Software Process Does Not Include a Pre-existing Data Model, Automatically Creating a New Data Model — 540

MODEL GENERATION SERVICE FOR DATA RETRIEVAL

BACKGROUND

Fulfilling legal requirements of data protection and privacy (DPP) is essential for business software. One example is the General Data Protection Regulation (GDPR) which is a European law that provides users with control over their personal data stored electronically by third party organizations (e.g., controllers, data processors, etc.) The organizations have the obligation to protect personal data to a degree where only necessary data is extracted with minimum interference to data privacy from employees, consumers, or other third parties. In addition, users have the right to request a portable copy of all personal data that has been collected by the organization. When the personal data is requested, the organization must provide a copy of the actual data to the user to be GDPR compliant. Another requirement is that the user has the right to request such personal data be erased. Furthermore, if the purpose of storing personal data is expired, the data must be deleted on request. Violations of the GDPR can result in fines and other negative consequences.

To comply with the requirements of DPP, an overall structure of the personal data (e.g., how it is stored) needs to be maintained by the organization, otherwise it can be difficult to retrieve all information about the user and to delete all information about the user on request. For database systems, the underlying models are often generated from information lifecycle management (ILM) objects and are subsequently adjusted by a human (i.e., manually). However, because of human intervention, multiple sources of errors are possible. For example, the ILM objects might be erroneous/incomplete as a result of a delay in performing the update. As another example, the human may fail to accurately perform the manual adjustment leading to an incorrect data model.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
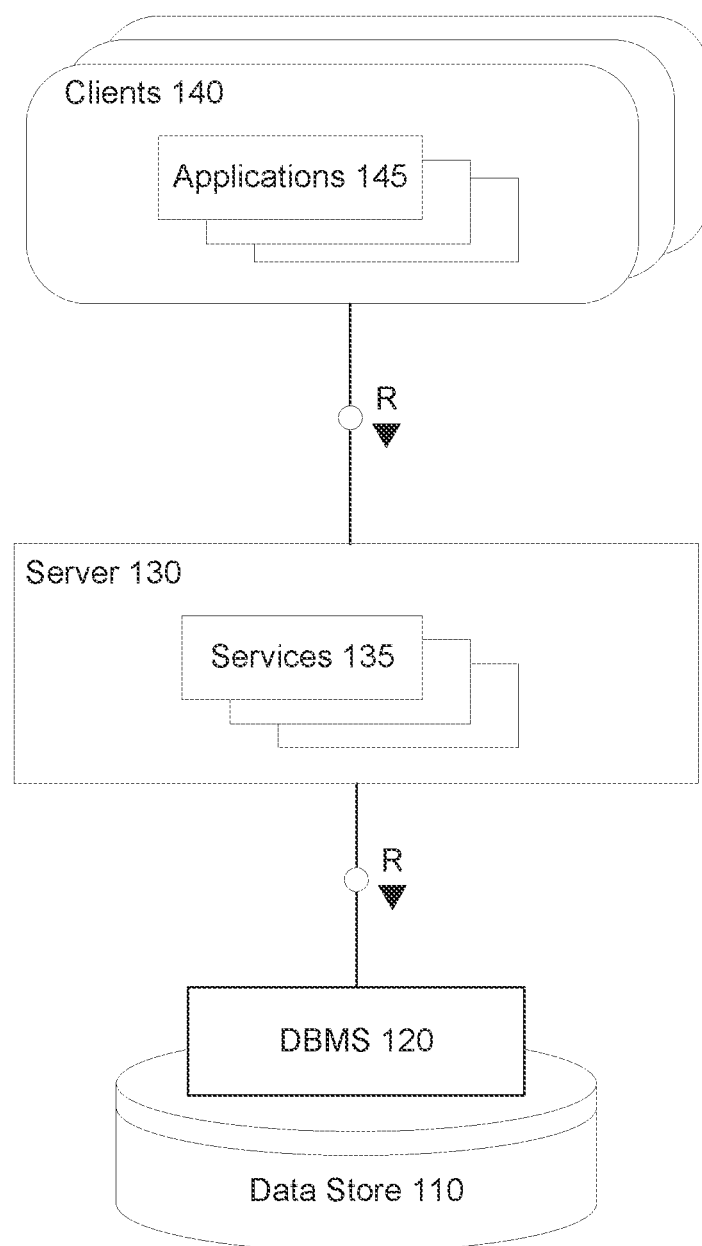
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Any organization (data processors) that stores data on European citizens are subject to DPP regulations including the GDPR regardless of the domicile of the organization. GDPR compliance became mandatory in 2018. The intent of these regulations is to provide a standardized set of expectations about how an organization must manage and protect personally identifiable information of its employees, clients, and other applicable data subjects. Personally identifiable information (PII) may include email addresses, social security numbers, phone numbers, physical addresses, usernames, passwords, payment information, confidential health records, employment records, and the like.

Host platforms that store personal data, for example, cloud platforms, web servers, databases, and the like, may be implemented with an information retrieval framework (IRF) that allows users to search for and retrieve all personal data of a specified user. The search results may then be output via a display and/or saved to memory. To be able to use the framework, a data model is necessary which identifies all relevant database tables that contain the personal data of the user. Conventionally, the data model is designed by a human such as an administrator or developer of the organization.

Over time, the data model may change. For example, new software functionality may be turned off or turned on, new features may be added, new programs/functionality may be added, and the like. Such changes can change where the data is stored (tables, fields, etc.) causing a change to the data model. When these changes occur, the data model needs to be manually updated. Otherwise, the data model may fail to identify "all" data associated with the user, which prevents the organization from satisfying the requirements under DPP regulations such as GDPR. As will be appreciated, a person manually updating a data model can lead to problems including human error in updating the model (resulting in an incorrect data model) and failure or delay of the user in updating the data model (also resulting in an incorrect data model).

The example embodiments overcome the drawbacks in the art by providing a model generation (and re-generation) service that can automatically build a data model for a software process based on data that is written to a data store (such as table data). Each software process may have its own data model. Furthermore, the model generation service may automatically update the data model over time based on changes in where the data is written to in the database by the software process which is detected by the model generation service. Here, the model generation service can identify which tables are being written to (and which fields in the tables) ensuring the accuracy of the data model, and preventing human error. Furthermore, the model generation service may work "in real time" because there is almost no delay between when the data is written and the data model is generated/updated.

As an example, the model generation service may listen or otherwise capture data as it is written to a database via a database interface (DBI) or other interface. The model generation service may maintain a list of software processes and corresponding data models. If the model generation service detects that a software process is missing a data model (i.e., there is no pre-existing data model for the software process), the model generation service may initially build a data model. The data model may include identifiers of tables and fields that are written to by the software process and links between the tables. Links may include columns in two different tables which correspond to the same data.

Different tables may have different field names (column names) for the data values that are being stored therein. Therefore, "automated" matching between columns of data of two different tables may not be possible. In this case, the example embodiments may use machine learning to predict matching columns. For example, the machine learning model may receive runtime data such as types, content values, and other software process information (metadata) which is created by the software process storing the data. The machine learning model may use this additional information to predict a more accurate link between two tables. Over time, the links may be modified, deleted, and/or new links may be added. The model generation service may continue to update the data model accordingly. Thus, the example embodiments provide an automated data modeling service that can continually update the data model as changes occur relieving such activities from being performed by a human. The data modeling service may be implemented at a data storage layer (e.g., in parallel with the DBI, etc.) ensuring that the correct data is captured and used in the modeling process.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis via a user interface displayed on the client 140 to view analytical information such as charts, graphs, tables, and the like, based on the underlying data stored in the data store 110. The application 145 may pass analytic information to one of services 135 based on input received via the client 140. A structured query language (SQL) script may be generated based on the request and forwarded to DBMS 120. DBMS 120 may execute the SQL script to return a result set based on data of data store 110, and the application 145 creates a report/visualization based on the result set. As another example, the analytic data may be input by the user and provided directly from the application 145 to the DBMS 120 or the data store 110.

According to various embodiments, an application 145 and/or a service 135 may include a software process that writes personal data of citizens to the data store 110. Although not shown in FIG. 1, a data modeling service may be implemented within or in association with one or more of the server 130, the DBMS 120, and the data store 110, and may automatically model the data that is written into the data store 110. For example, SQL commands, NoSQL commands, and the like, may write data to the data store 110, and may include table identifiers, field identifiers, and the like, which are captured by the data modeling service and used for model generation and update.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

The data (e.g., data records, data entries, documents, etc.) which include personal data may be stored, modified, deleted, and the like, within the data store 110. As an example, data may be created, written, modified, or deleted based on instructions from any of the applications 145, the services 135, and the like. Each piece of data may be assigned a globally unique identifier (GUID) by an operating system, or other program of the database 100. The GUID is used to uniquely identify that data from among all other data stored within the database 100. GUIDs may be created in multiple ways including, but not limited to, random, time-based, hardware-based, content-based, a combination thereof, and the like.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Figure 2A:
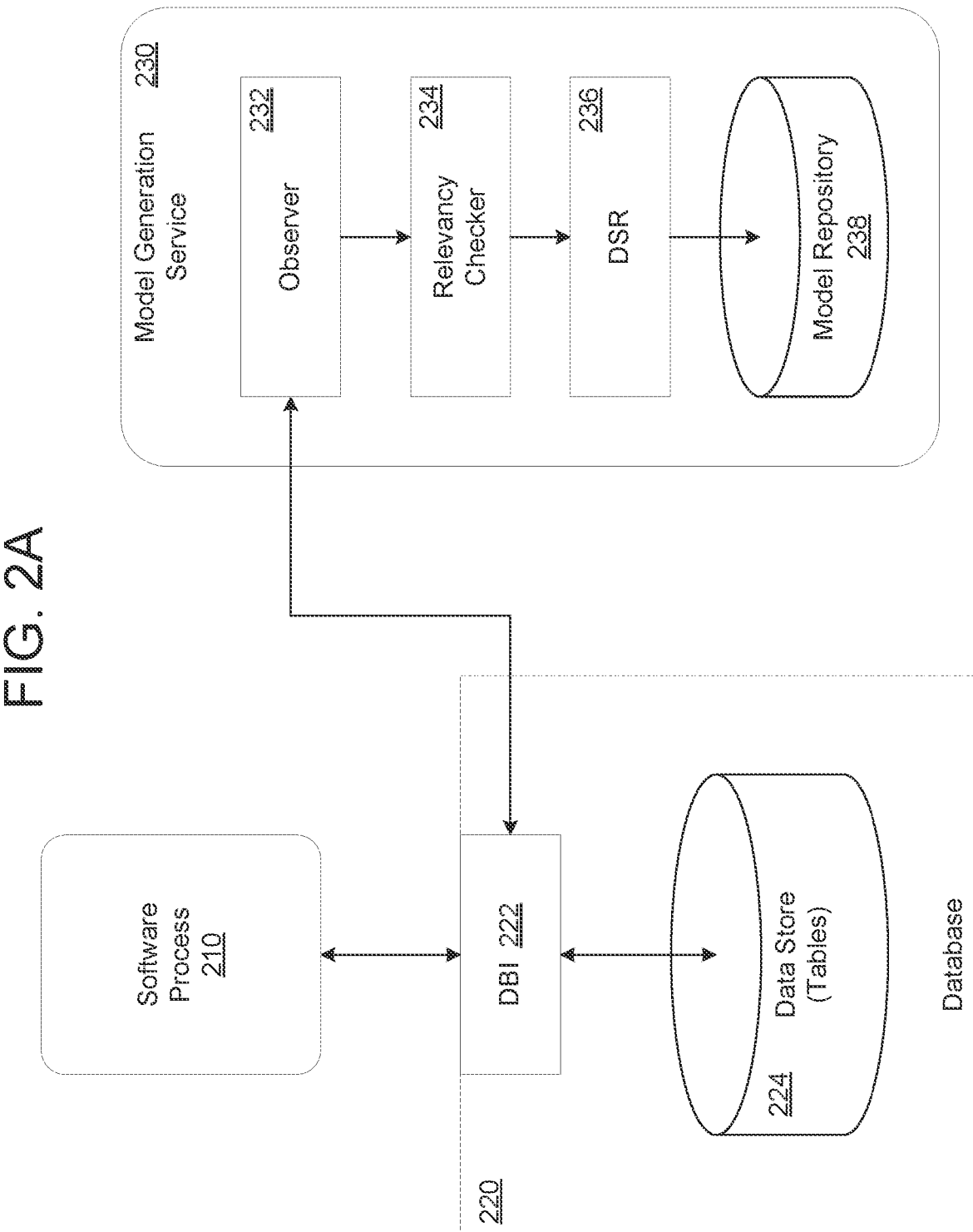
FIG. 2A is a diagram illustrating a process of a model generation service modeling data written to a database in accordance with example embodiments.

FIG. 2A illustrates a process 200A of a model generation service 230 modeling data written to a database in accordance with example embodiments. Referring to FIG. 2A, a software process 210 within an application or other software program may interact with a database 220 to store data therein. According to various embodiments, the model generation services 230 may automatically build a data model for the software process 210. Furthermore, the model generation service 230 may automatically update/modify a pre-existing data model when it detects a change has occurred to the data model. Each software process (including software process 210) may have its own data model. Here, the model generation service 230 may identify the software process 210 as it interacts with the database 220. For example, each storage request (e.g., SQL command, NOSQL command, etc.) may include an identifier of the software process 210. The model generation service 230 may maintain a list of identifiers of different software processes. Furthermore, the model generation service 230 may maintain a data model (e.g., in FIGS. 2B and 2C) for each software process.

In the example of FIG. 2A, the model generation service 230 includes an observer 232 which is configured to listen or otherwise monitor data requests, for example, SQL commands, NoSQL commands, storage requests, etc. as they are transmitted from the software process 210 to the database 220. In this example, the observer 232 includes an agent software inside a database interface (DBI) 222, however, embodiments are not limited thereto. As another example, the observer 230 may include an agent or other software code within an application that includes the software process 210, with the database 220, or the like. That is, the observer 232 may be activated separately, for example, on application or business object level. Other restrictions are also possible to reduce the scope on package or application/software component levels. The DBI 222 is the interface that connects and disconnects the application (which includes the software process 210) to the database 220. The DBI 222 may also route the database requests to the tables within the data store 224.

The model generation service 230 may include a relevancy checker 234 which may be used to filter (remove) data (e.g., non-GDPR data) that is analyzed by the model generation service 230. The relevancy of data is defined by its type. For example, only transactional/master data may be considered for further analysis because it might contain personal information. Meanwhile, other types of data such as configuration data, customization data, and the like, may be filtered out by the relevancy checker 234 because they do not contain personal information in general. As an example, the relevancy checker 234 may perform the relevancy check by retrieving a data category of the table within a data store 224 of the database 220 that is being written to by the storage request from the software process 210. The relevant data that is not filtered out may be provided to a data source relation (DSR) 236 component.

In addition to considering the design-time data (e.g., table names, field names, etc.) within the storage requests, the DSR 236 may also analyze the runtime data between the software process 210 and the database 220 include any content being transmitted with the storage requests. That is, not only the technical fields of the data sources are compared but also, the actual values of the fields can be compared. To analyze the content, the DSR 236 may use machine learning (ML) techniques to derive patterns, in which certain fields are linked to each other at runtime. The data from the observer 232 which has been filtered by the relevancy checker 234 may be analyzed by the data source relation (DSR) 236. The DSR 236 checks technical attributes and metadata of the fields in the affected data sources. Possible field-pairs are determined, which might be related to each other (i.e., links). In addition, the content of the fields is compared, to check which fields belong together. The derived patterns may be used to generate links between data sources and fields, depending on the processed data. The links are not necessarily static. They might be different, depending on the applications/process types.

As described herein, a "link" refers to a field (column of data) within a table that matches a field (another column of data) in another table. By linking the two tables together, it is easier to retrieve the data when subsequently requested for retrieval and/or erasure. The table names of database tables within the data store 224 that are accessed by the software process 210 and the links that are identified can be stored within a data model of the software process 210 that is stored within a model repository 238.

Examples of the runtime data that can be analyzed by the DSR 236 to identify links between tables include schema data (e.g., table names, column names, constraints, foreign keys, indexes, sequences, etc.), program data (e.g., views, user defined functions, stored procedures, triggers, etc.), security data (e.g., users, user groups, privileges, etc.), physical implementation (e.g., partition IDs, file identifiers, backups, etc.), storage data (e.g., table size, number of rows in a table, index data, etc.), auditing data (e.g., session information, connection history, query history, etc.), and the like.

The model generation service 230 may initially generate a data model when there is no pre-existing data model for the software process 210. Here, the model generation service 230 may initialize a new/empty model and automatically fill it with information such as table names, field names (columns), links, and the like, which define the model. If a data model already exists for the software process 210, the model generation services 230 may determine whether the model needs to be updated. For example, the model generation service 230 may detect which tables are being accessed, which fields (columns) in which tables are being accessed, whether a link has changed, a new link has been added, an existing link has been removed, and the like. The model generation service 230 can update the data model based on any detected changes.

When an information retrieval request is received by the database 220, the database 220 may identify all software processes that are relevant to the received request (e.g., the particular user who is associated with the request) and retrieve the most up-to-date data model of the software processes from the model generation service 230 (or from a storage of the database managed by the model generation service 230 such as the model repository 238). Accordingly, the database 220 can retrieve the user data from the data store 224 (tables) based on the up-to-date data model and return all information to the requestor. By automatically building the data model and updating the data model (e.g., in real time) there is no delay between when the changes to the data model occur and the data model is updated. Thus, the possibility of the data model being incorrect when the request is received for retrieving the data is reduced significantly.

Changes to the data model may be caused by various events. For example, a developer or manager of the software process 210 may turn on or turn off a particular functionality. For example, the software process 210 may be a user interface process. Here, the developer may turn on a new feature (e.g., a service plan) that entails new fields of data to be entered by the user. The new data may have its own table (or set of tables) in the data store 224 that are linked to existing tables in the original data model. In this example, the model generation service 230 may detect the new tables being written to in the data store 224, and also the links between the existing tables in the data model and the new tables being added to the data model. Accordingly, the model generation service 230 may update the data model to include the new tables and the new links. Likewise, when existing features are turned off, the model generation service 230 may remove tables, links, etc.

In some embodiments, the model generation service 230 may be turned off/on selectively based on predetermined functions being performed by the application/software process 210. That is, rather than have the model generation service 230 running all the time, the model generation service 230 may be executed periodically. For example, the model generation service 230 may be turned on during an initial deployment of the software process 210 (and corresponding application) to a host platform, right after a software update to the application, and the like. Thus, the model generation service 230 does not need to run continuously but only a specified times when there is likely to be changes to the data model.

Figures 2B, 2C:
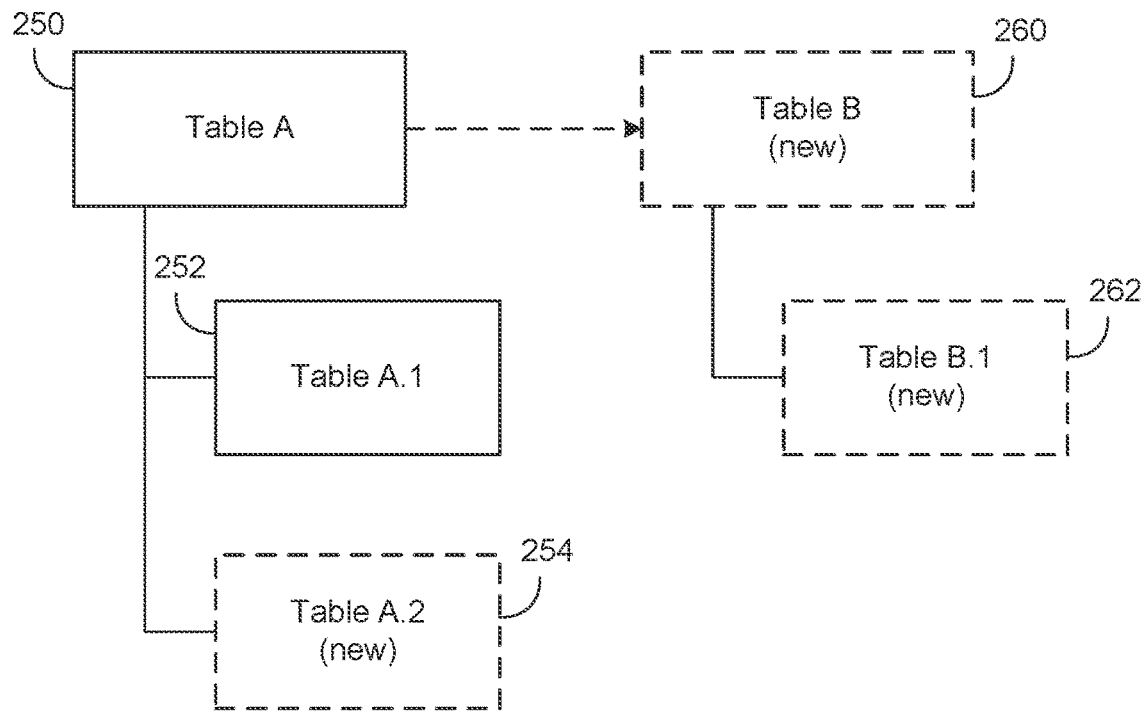
FIGS. 2B and 2C are diagrams illustrating modeling processes of a data model by the model generation service in accordance with example embodiments.

FIGS. 2B and 2C illustrate example modeling processes 200B and 200C of a data model for the software process 210 generated by the model generation service 230 in accordance with example embodiments. Referring to FIG. 2B, an existing data model includes tables 250 and 252 represented by unbroken lines. Here, the tables 250 and 252 are identified by table names (Table A and Table A.1). The data model indicates that Table A.1 is a child table of Table A, which is the parent table. In this process 200B, the model generation service 230 detects that three new tables 254, 260, and 262 are being written to by the software process 210. The model generation service 230 adds the tables 254, 260, and 262 (represented by broken lines) to the existing data model which already includes tables 250 and 252. Here, the model generation service 230 detects that table 254 is a child table of table 250, and creates that relationship within the data model. The model generation service 230 also detects that table 260 is a different table that is linked to table 250, and that table 262 is a child table of table 260. For example, the link may be a field (table column) that is shared in common between the table 250 and the table 260. The data model may include identifiers of table names as well as field names, and link information identifying links between the tables.

FIG. 2C illustrates a process 200C of linking two columns 251 and 261 between the two tables 250 and 260 together. In this example, column $C_1$ 251 of Table 250 may include the same name as column $C_1$ of table 260. In a conventional/manual process, the same name would likely be detected by the human as a same column/field shared between the two tables. However, the model generation service 230 may analyze additional data (not just technical table data) to identify whether the two columns are actually linked (i.e., store the same data). In particular, a machine learning algorithm may receive runtime data of the two tables 250 and 260. The runtime data may include metadata including field types (integer, Boolean, string, etc.) of each column, field lengths, number of rows, content within the columns, etc., and use this metadata to find a best match or matches. The runtime data may also include session data, user data, security data, historical access/request data, and the like. In this case, the model generation services 230 detects that the column $C_1$ 251 is actually linked to column $C_3$ 261 of table 260 which has a different name, but shares other information/content in common. Accordingly, a link between the column $C_1$ 251 of table 250 and the column $C_3$ 261 of table 260 is detected and added to the data model.

Figure 3A:
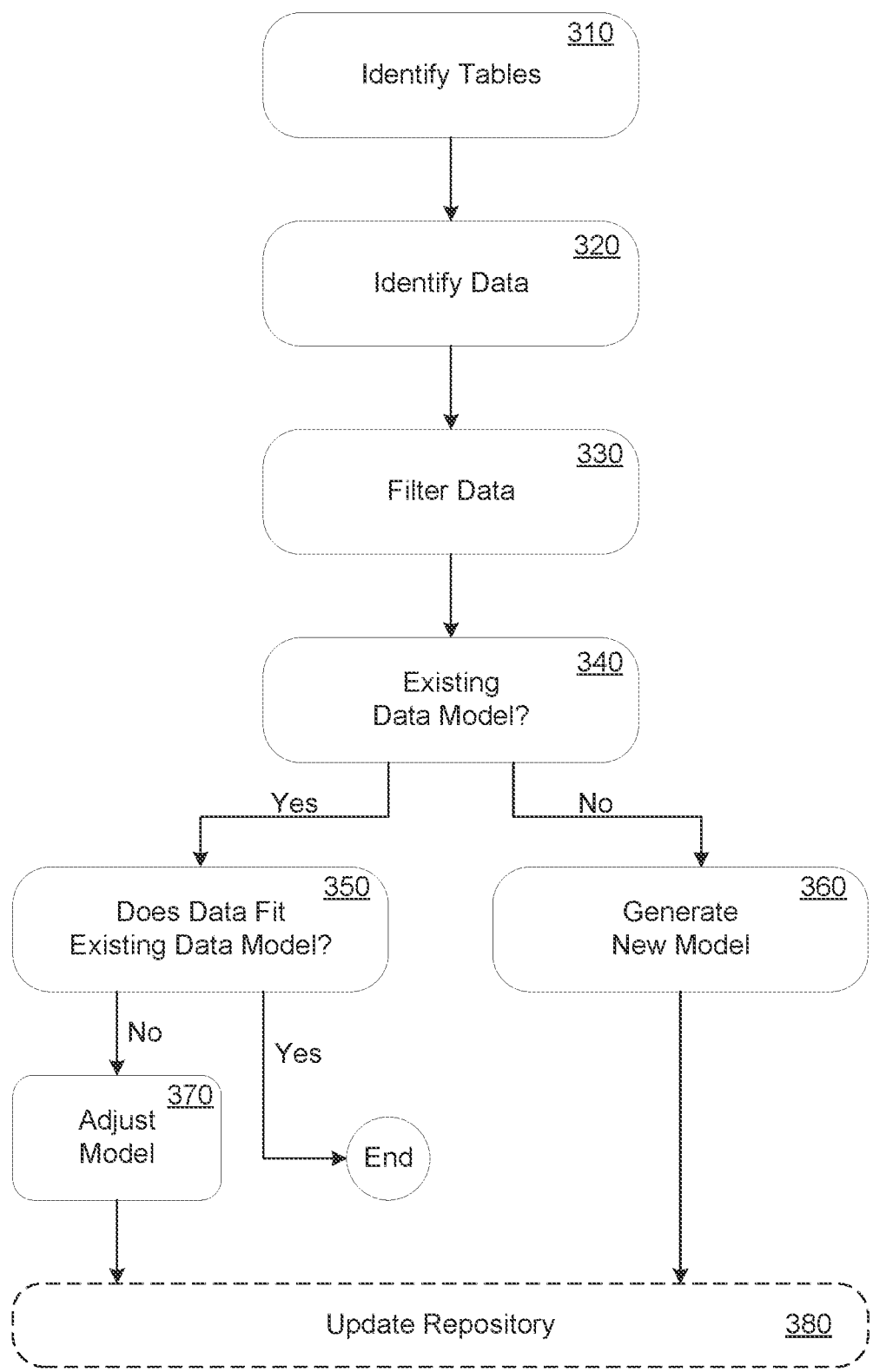
FIG. 3A is a diagram illustrating a process of determining to create and/or update a data model in accordance with an example embodiment.

FIG. 3A illustrates a process 300A of determining to create and/or update a data model in accordance with an example embodiment. In this example, the model generation service can perform an initial model generation and/or a model update based on the details of the data. Referring to FIG. 3A, in 310 the model generation service monitors data between a software process and an underlying data store and identifies table names that are accessed (written to) by a software process. The identification may also include field names, and the like. In 320, the model generation service identifies data (runtime data) that is associated with the software process accessing the underlying data store. The runtime data may include data content, session content, user information, security data, etc. In 330, the model generation service may filter the data to remove any data that is not relevant (e.g., data that is not subject to GDPR). Here, the model generation service may identify a category of the table where the data is being written to. The category may be extracted from the table itself or stored in an list such as an dictionary.

In 340, the model generation service determines whether an existing data model exists for the software process. If an existing model does exist, in 350, the model generation service determines whether the filtered data fits the existing data model. Here, the model generation services may detect whether there are any changes to tables being accessed, changes to fields/columns being accessed, changes to links, and the like. If the model generation service determines that no changes have occurred, in 360 the model generation service may terminate. If the model generation service determines that changes to the existing model have occurred, in 370, the model generation service may adjust the data model. Furthermore, in 380, the updated data model may be stored in a model repository.

If the model generation service determines that no data model exists for the software process in 340, in 360, the model generation process may create a new data model which is filled with table names (identifiers), field names, links, and the like, that are automatically detected by the model generation services. Furthermore, the model generation service may proceed to 380 and store the newly generated model in the model repository.

Figure 3B:
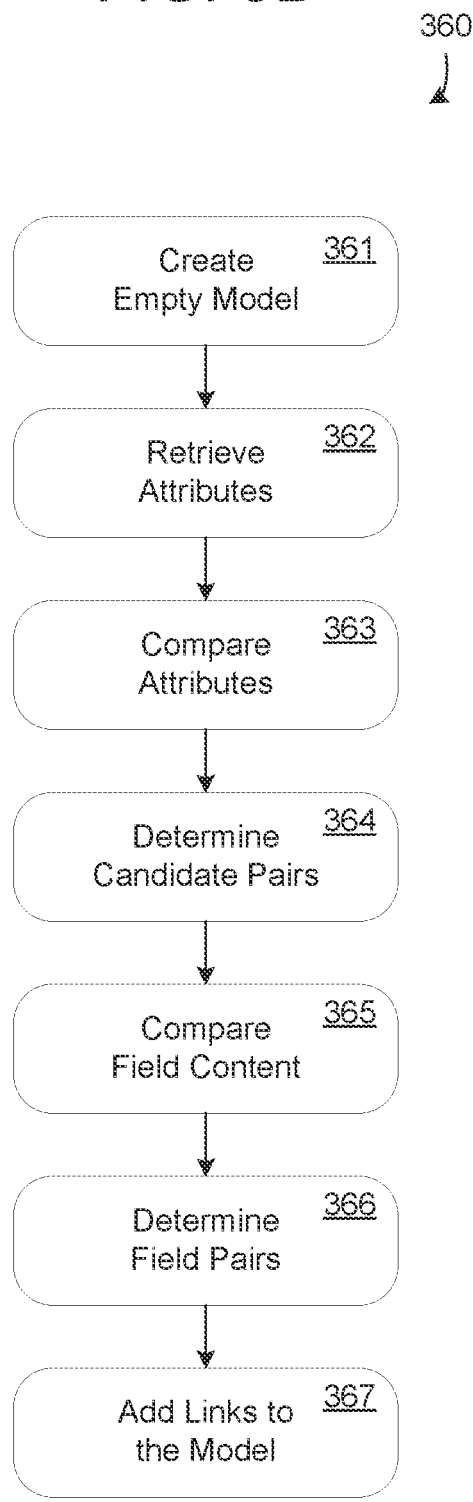
FIG. 3B is a diagram illustrating a process of creating a new data model in accordance with example embodiments.

FIG. 3B illustrates a process 300B of creating a new data model which corresponds to step 360 in FIG. 3A, in accordance with example embodiments. Referring to FIG. 3B, the model generation service may initialize a new/empty data model in 361 from a standard template or other previously defined data. In 362, the model generation service may retrieve the attributes of the data being written (e.g., table names, field/columns, links, etc.), and in 363 the model generation service may compare the attributes together to identify potential links. In 364, the model generation service may determine candidate pairs of columns that are linked, and in 365, the model generation service may compare the field content and other runtime data (e.g., using machine learning, etc.) to identify matching links, in 366. In 367, the model generation service may add the table names and the identified matching links to the newly created data model.

Figure 3C:
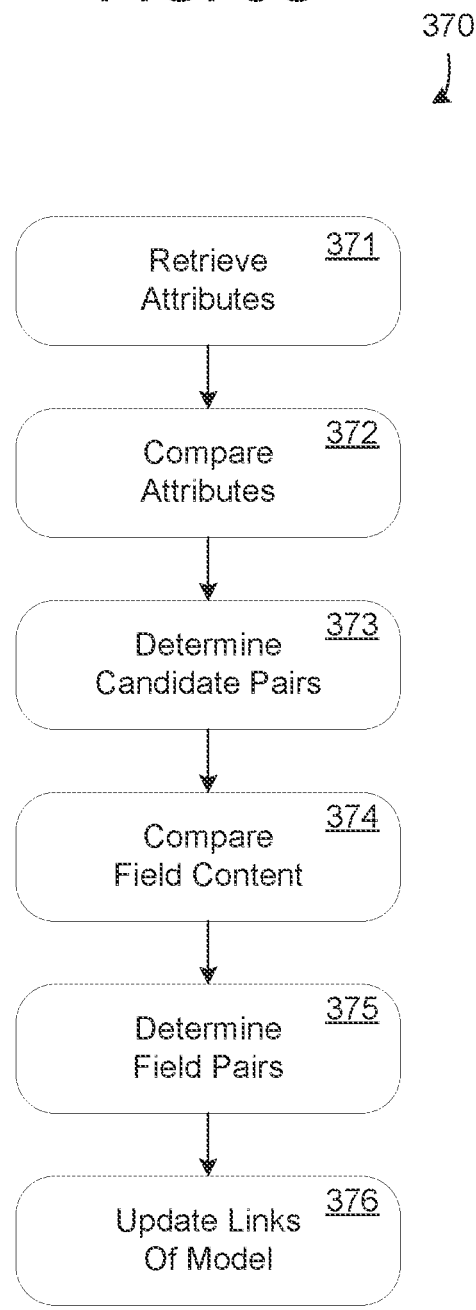
FIG. 3C is a diagram illustrating a process of updating an existing data model in accordance with example embodiments.

FIG. 3C illustrates a process 300C of updating an existing data model which corresponds to step 370 in FIG. 3A, in accordance with example embodiments. The steps in the process 300C of FIG. 3C are similar to the steps of the process 300B of FIG. 3C. However, in this example, the model generation service does not need to create a new model therefore that step can be omitted. Meanwhile, the steps 371-375 correspond to the steps 362-366 of FIG. 3B, thus a redundant description is omitted for brevity. In the example of FIG. 3C, though, rather than create a new model, in 376, the model generation service updates an existing model with any changes to tables, columns, links, or the like, based on the determinations made in 371-375.

Figure 4:
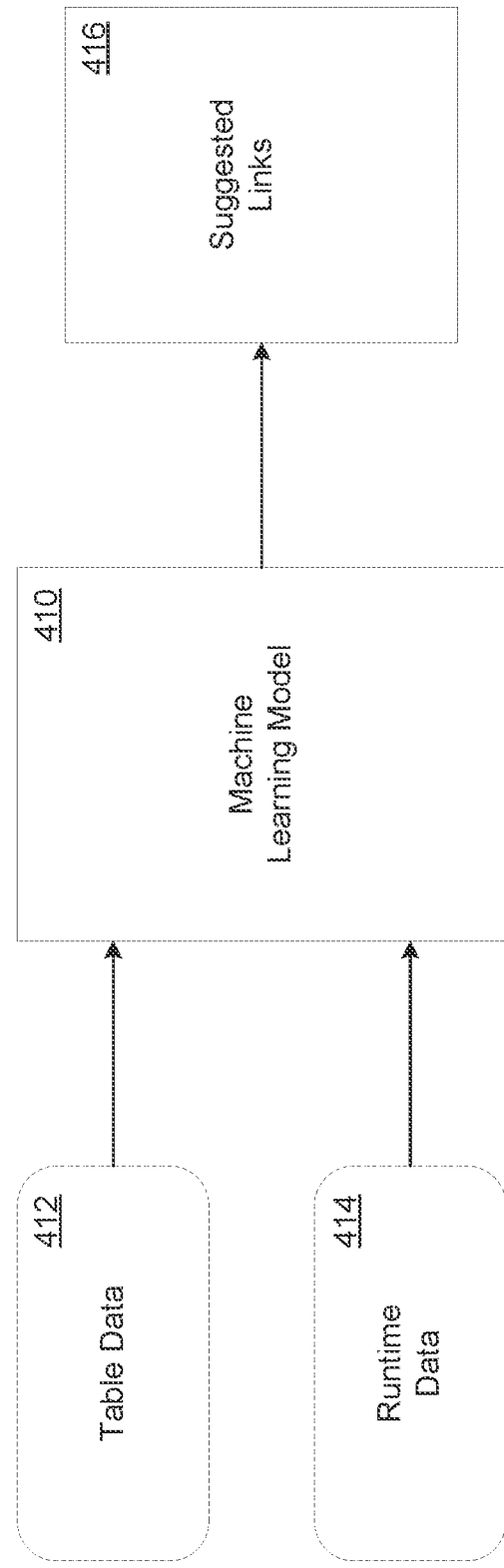
FIG. 4 is a diagram illustrating a process of identifying links using runtime data in accordance with example embodiments.

FIG. 4 illustrates a process 400 of identifying links using runtime data in accordance with example embodiments. For example, the process 400 may be performed by the model generation service described herein. As another example, the process 400 may be performed by the model generation service in communication with an external service that performs the machine learning process. Referring to FIG. 4, a machine learning model 410 receives table data 412 that is captured by monitoring a communication session between a software process and an underlying data store. The table data 412 may include tables and fields/columns that are accessed (written to) by the software process. In addition, the machine learning model 410 may receive runtime data 414 of the communication session between the software process and the underlying data store. The runtime data 414 may include table metadata, session data, user data, storage data, and the like.

In this example, the machine learning model 410 is trained to identify links between tables. For example, the machine learning model 410 may be trained on historical data including actual links, runtime data, and table data. The output of the machine learning model 410 may be suggested links 416 for inclusion in a data model. Here, the suggested links 416 may be added by the model generation service to a new data model and/or used to update an existing data model for the software process.

Figure 5:
FIG. 5 is a diagram illustrating a method of modeling data for retrieval from a database in accordance with an example embodiment.
Figure 5:
Figure 5:
Figure 5:

FIG. 5 illustrates a method 500 of modeling data for retrieval from a database in accordance with an example embodiment. For example, the method 500 may be performed by a database node, a cloud platform, a server, a computing system (user device), a combination of devices/nodes, or the like. Referring to FIG. 5, in 510, the method may include monitoring data that is written to database tables of a database by a software process. For example, the monitoring may include monitoring the data via a database interface (DBI) between the software process and the database tables of the database, however embodiments are not limited thereto. The data may include personal data and non-personal data. In some embodiments, the data may be filtered to remove any data that does not include personal data such as customization data, configuration data, and the like.

In 520, the method may include identifying links between the database tables where the monitored data is written. For example, the links may include tables that are related by the data stored therein. For example, a first table may share a column of data in common with a second table. In this example, the two tables may be considered "linked" tables. In some cases, the column names may be identical enabling automated matching. As another example, the column names may be different and may rely on machine learning, etc. to predict a match.

In 530, the method may include determining whether the software process has a pre-existing data model for retrieving data stored in the database. For example, the data that is received by the database may include an identifier of the software process which is transmitting the data to the database. Here, the model generation service may detect the identifier of the software process and determine whether a data model already exists for the software process (based on the process identifier) in a model repository. If no model exists, in 540, the method may include creating a new data model for the software process, automatically filling the new data model with names of the database tables where the monitored data is written and links between the database tables, and storing the new data model via a database repository.

In some embodiments, the method may further include, in response to a determination that the software process includes the pre-existing data model, detecting that the pre-existing data model has changed based on one or more of the names of the database tables where the monitored data is written and the links identified between the database tables. In some embodiments, the method may further include automatically modifying the pre-existing data model based on the detected change to the pre-existing data model, and storing the modified data model via the database repository. In some embodiments, the automatically modifying may include one or more of adding a name of a new database table, removing a name of an existing database table, adding a new link between the database tables, and removing a link between the database tables, to create the modified data model.

In some embodiments, the detecting may include determining, via a machine learning model, a new link between the database tables based on runtime data included in the monitored data, where the runtime data includes one or more technical attributes of fields and metadata of the fields, included in the database tables. In some embodiments, the detecting may include detecting that the pre-existing data model has changed based on pre-existing table names and pre-existing links that are stored within an information lifecycle management (ILM) object dedicated to the software process. In some embodiments, the method may further include receiving a request for user data and retrieving the user data from one or more database tables written to by the software process based on the new data model for the software process.

Figure 6:
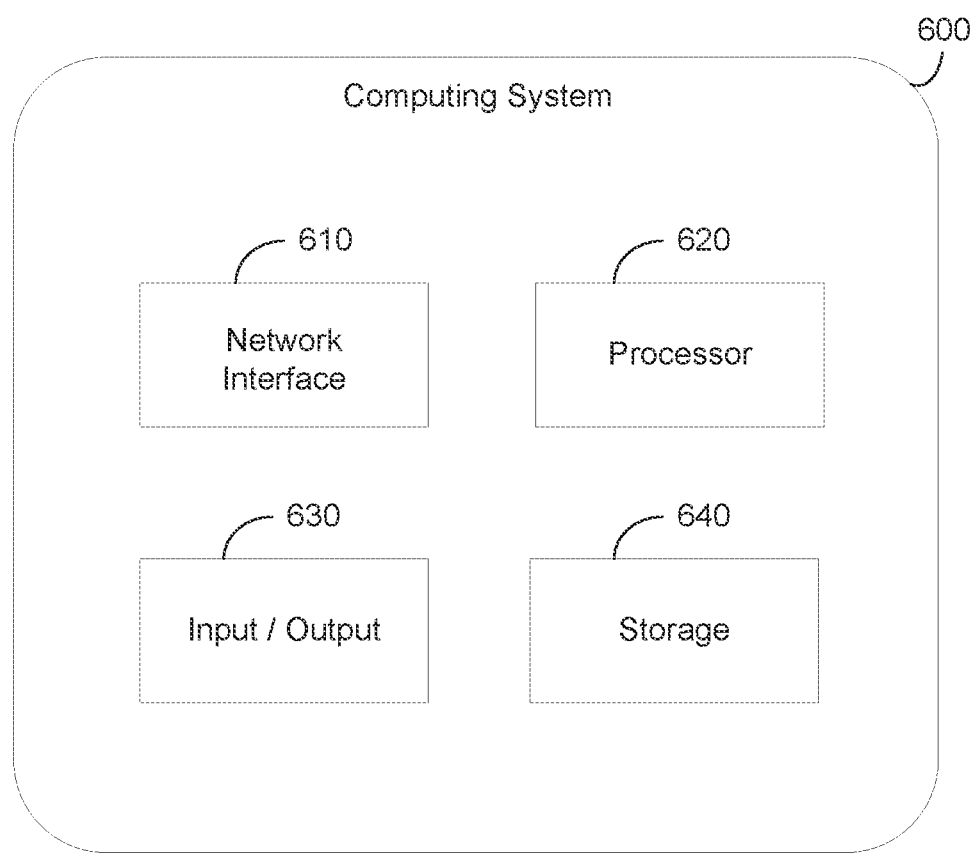
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, records, partitions and sub-partitions. The storage 640 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory; and
a processor configured to
monitor data that is written to database tables of a database by a software process,
identify links between the database tables where the monitored data is written,
determine whether the software process has a pre-existing data model for retrieving data stored in the database, and
in response to a determination that the software process does not include the pre-existing data model, creating a new data model for the software process which includes names of the database tables where the monitored data is written and links between the database tables, and store the new data model via the memory.

2. The computing system of claim 1, wherein the processor is configured to monitor the data via a database interface (DBI) between the software process and the database tables of the database.

3. The computing system of claim 1, wherein, in response to a determination that the software process includes the pre-existing data model, the processor is further configured to detect that the pre-existing data model has changed based on one or more of the names of the database tables where the monitored data is written and the links identified between the database tables.

4. The computing system of claim 3, wherein the processor is further configured to automatically modify the pre-existing data model based on the detected change to the pre-existing data model, and store the modified data model via the database repository.

5. The computing system of claim 4, wherein the processor is configured to one or more of add a name of a new database table, remove a name of an existing database table, add a new link between the database tables, and remove a link between the database tables, to create the modified data model.

6. The computing system of claim 3, wherein the processor is further configured to determine, via a machine learning model, a new link between the database tables based on runtime data included in the monitored data, where the runtime data includes one or more technical attributes of fields and metadata of the fields, included in the database tables.

7. The computing system of claim 3, wherein the processor is configured to detect that the pre-existing data model has changed based on pre-existing table names and pre-existing links that are stored within an information lifecycle management (ILM) object dedicated to the software process.

8. The computing system of claim 1, wherein the processor is further configured to receive a request for user data and retrieve the user data from one or more database tables written to by the software process based on the new data model for the software process.

9. A method comprising:
monitoring data that is written to database tables of a database by a software process;
identifying links between the database tables where the monitored data is written;
determining whether the software process has a pre-existing data model for retrieving data stored in the database; and
in response to a determination that the software process does not include the pre-existing data model, creating a new data model for the software process which includes names of the database tables where the monitored data is written and links between the database tables, and storing the new data model via a database repository.

10. The method of claim 9, wherein the monitoring comprises monitoring the data via a database interface (DBI) between the software process and the database tables of the database.

11. The method of claim 9, wherein the method further comprises, in response to a determination that the software process includes the pre-existing data model, detecting that the pre-existing data model has changed based on one or more of the names of the database tables where the monitored data is written and the links identified between the database tables.

12. The method of claim 11, wherein the method further comprises automatically modifying the pre-existing data model based on the detected change to the pre-existing data model, and storing the modified data model via the database repository.

13. The method of claim 12, wherein the automatically modifying comprises one or more of adding a name of a new database table, removing a name of an existing database table, adding a new link between the database tables, and removing a link between the database tables, to create the modified data model.

14. The method of claim 11, wherein the detecting comprises determining, via a machine learning model, a new link between the database tables based on runtime data included in the monitored data, where the runtime data includes one or more technical attributes of fields and metadata of the fields, included in the database tables.

15. The method of claim 11, wherein the detecting comprises detecting that the pre-existing data model has changed based on pre-existing table names and pre-existing links that are stored within an information lifecycle management (ILM) object dedicated to the software process.

16. The method of claim 9, further comprising receiving a request for user data and retrieving the user data from one or more database tables written to by the software process based on the new data model for the software process.

17. A non-transitory computer-readable medium comprising instructions which when executed by a processor cause a computer to perform a method comprising:
monitoring data that is written to database tables of a database by a software process;
identifying links between the database tables where the monitored data is written;
determining whether the software process has a pre-existing data model for retrieving data stored in the database; and
in response to a determination that the software process does not include the pre-existing data model, creating a new data model for the software process which includes names of the database tables where the monitored data is written and links between the database tables, and storing the new data model via a database repository.

18. The non-transitory computer-readable medium of claim 17, wherein the monitoring comprises monitoring the data via a database interface (DBI) between the software process and the database tables of the database.

19. The non-transitory computer-readable medium of claim 17, wherein the method further comprises, in response to a determination that the software process includes the pre-existing data model, detecting that the pre-existing data model has changed based on one or more of the names of the database tables where the monitored data is written and the links identified between the database tables.

20. The non-transitory computer-readable medium of claim 19, wherein the method further comprises automatically modifying the pre-existing data model based on the detected change to the pre-existing data model, and storing the modified data model via the database repository.

* * * * *